UNITED STATES PATENT OFFICE.

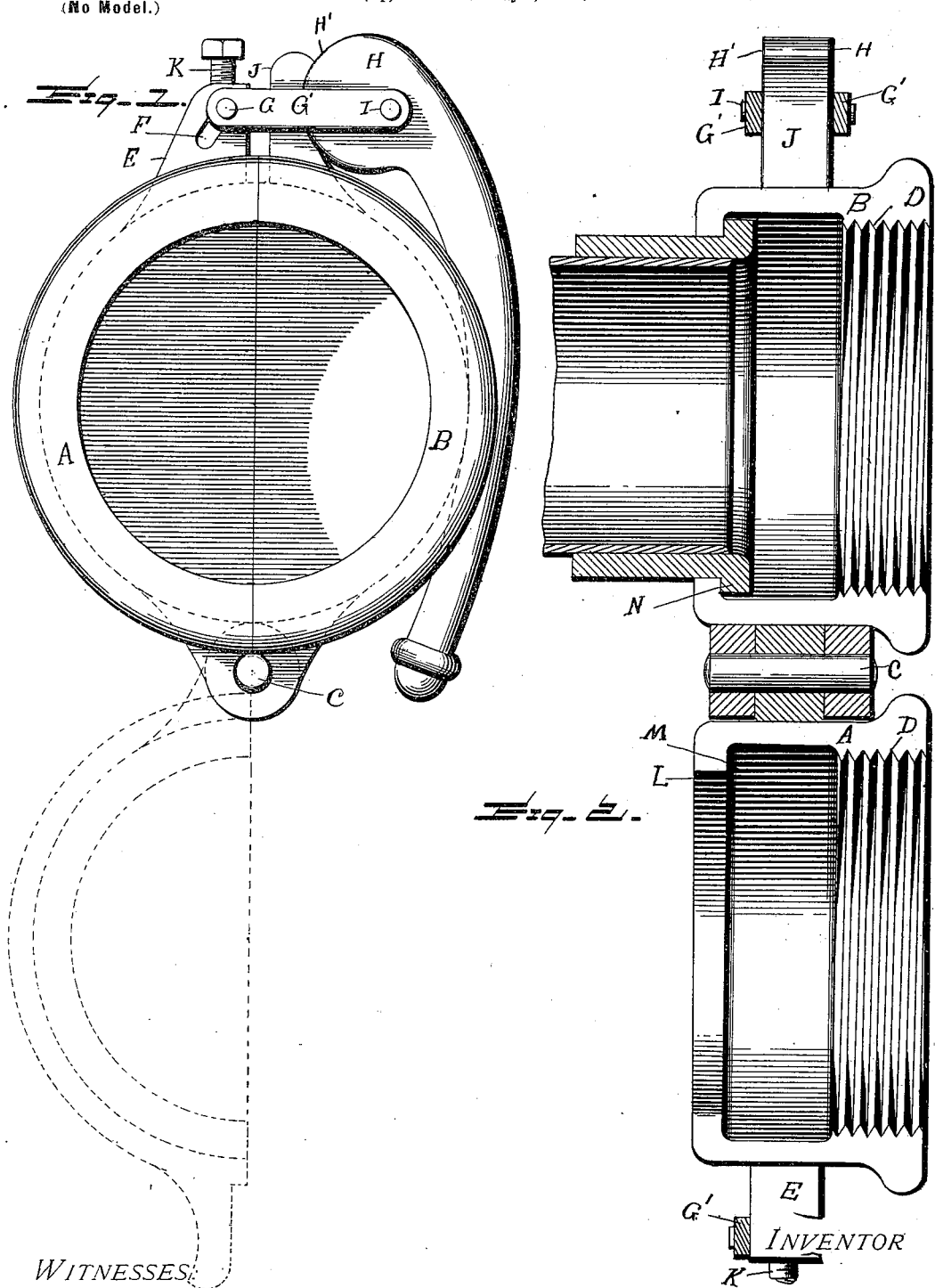

ROBERT D. TACKABERRY, OF LEWISTON, MAINE.

MULTIPART HYDRANT-CAP AND PIPE-COUPLING.

SPECIFICATION forming part of Letters Patent No. 667,808, dated February 12, 1901.

Application filed May 7, 1900. Serial No. 15,699. (No model.)

*To all whom it may concern:*

Be it known that I, ROBERT D. TACKABERRY, a citizen of the United States, residing at Lewiston, in the county of Androscoggin and State of Maine, have invented certain new and useful Improvements in Multipart Hydrant-Caps and Pipe-Couplings; and I do hereby declare the following to be a full, clear, and exact description of the invention, such as will enable others skilled in the art to which it appertains to make and use the same.

It is desirable that caps for nozzles for hydrants and couplings for hose, fire-engines, and locomotives should be readily detachable instead of requiring the slow process of unscrewing them; and my present invention has for its object the provision of a cap or coupling which can be instantly removed and which has all the advantages of the security afforded by a screw-threaded joint.

My invention is equally applicable to hose and pipe couplings, the only difference being that when used as a coupling the end of the coupling is open, as shown in Fig. 2.

My invention is designed, primarily, to save time, especially when used as a cap for hydrant-nozzles, which in case of fire must be handled quickly.

In the accompanying drawings, Figure 1 is an end view of my multipart hydrant-cap, the parts being shown closed and locked; and Fig. 2 is a plan view of my device as embodied in a coupling, the two parts being shown open.

In said drawings the same letters of reference refer to like parts.

Referring to the drawings, A and B represent similar semicircular members pivotally joined together at a point directly opposite the line of division, as at C. The two parts are interiorly screw-threaded, as seen at D, and adapted thereby to fit a thread on the nozzle. One member is provided with a projection E thereon, in which is a slot F. Two links G' are pivotally supported on a pin G, which passes loosely through said slot. In the opposite end of said links is pivotally mounted a locking-lever H, said lever having a rounded end H' and being supported by a pin I passing eccentrically through said rounded end and through said slot. On the opposite member is a lug J, adapted to be engaged by the rounded end of said eccentrically-mounted lever, whereby the two members are firmly locked together. I provide for taking up the wear between the locking-lever and the lug by means of an adjusting-screw K, mounted in the projection E and adapted to engage the pin G and adjust it in the slot by increasing the distance of the pivot-point from the point of contact of the bar on the lug.

The use of my invention as applied to a cap is as follows: The two parts are unlocked and then placed in position upon the threaded nozzle of the hydrant as far as desired and locked in position, or they may be securely locked together and then turned in the usual manner of a nut upon the threaded nozzle. When it is desired to remove the cap, it is only necessary to raise the end of the lever, which allows it to swing out from contact with the lug, which allows the two members to separate freely.

In applying my improved device to a coupling the members A and B are provided with the connecting-hinge, screw-thread, lug, the locking devices, and other devices, as before, and in the end opposite the screw-thread with a hole L of slightly less diameter than the diameter of the members, forming a flange M. The end of the hose or pipe is supplied with a flanged nipple N, the flanges on the nipple adapted to engage the flanges on the members A and B, thus forming a swivel-joint between the coupling and hose or pipe.

Having thus described my invention and its use, I claim—

1. In a multipart hydrant-cap, members hinged together at one edge and provided at the other edge with means for locking the parts together, said members being provided at the outer end with transversely-extending webs which when the parts are in locking position form tight joints and a complete closure of that end and at the inner end with screw-threads which become continuous when the parts are in position to be locked.

2. In a multipart hydrant-cap and pipe-coupling, two similar semicircular members hinged together at one edge, said two members when closed having a continuous interior screw-thread, a lug on one member and a slotted projection on the other member, in combination with a locking device consisting of links pivotally mounted in said slot and carrying on their opposite ends a lever eccentrically mounted and adapted to engage said lug and means for adjusting said links in said slot.

In testimony whereof I affix my signature, in presence of two witnesses, this 11th day of April, 1900.

ROBERT D. TACKABERRY.

Witnesses:
WM. P. LEONARD,
HENRI P. BICHARD.